United States Patent [19]

Sugier et al.

[11] Patent Number: 5,244,878
[45] Date of Patent: Sep. 14, 1993

[54] PROCESS FOR DELAYING THE FORMATION AND/OR REDUCING THE AGGLOMERATION TENDENCY OF HYDRATES

[75] Inventors: André Sugier; Paul Bourgmayer, both of Rueil Malmaison; Jean-Pierre Durand, Chatou, all of France

[73] Assignee: Institut Francais Du Petrole, Rueil-Malmaison, France

[21] Appl. No.: 729,790

[22] Filed: Jul. 10, 1991

Related U.S. Application Data

[63] Continuation of Ser. No. 288,986, Dec. 23, 1988, abandoned.

[30] Foreign Application Priority Data

Dec. 30, 1987 [FR] France .................. 87 18433

[51] Int. Cl.$^5$ .................. F17D 1/05; F17D 1/04
[52] U.S. Cl. .................. 507/90; 137/13; 166/310; 585/15; 585/866; 585/950; 95/153
[58] Field of Search .................. 252/83; 137/13; 166/310; 585/15, 866, 950; 55/29; 507/90

[56] References Cited

U.S. PATENT DOCUMENTS

| | | | |
|---|---|---|---|
| 1,866,560 | 7/1932 | Gordon et al. | 55/29 |
| 3,146,272 | 8/1964 | Lloyd | 55/29 X |
| 3,348,614 | 10/1967 | Sinclair et al. | 166/310 |
| 3,407,204 | 10/1968 | Shay et al. | 260/286 |
| 3,679,582 | 7/1972 | Wagenaar et al. | 252/8.3 |
| 3,886,757 | 6/1975 | McClintlock et al. | 62/20 |
| 4,456,067 | 6/1984 | Pinner, Jr. | 166/279 |
| 4,586,938 | 5/1986 | Cornelissen | 137/13 X |
| 4,597,779 | 7/1986 | Diaz | 166/267 X |
| 4,601,738 | 7/1986 | Mehra | 55/29 X |
| 4,915,176 | 4/1990 | Sugier et al. | 137/13 X |
| 4,973,775 | 11/1990 | Sugier et al. | 585/15 |

FOREIGN PATENT DOCUMENTS

1133416 3/1957 France .

OTHER PUBLICATIONS

Derwent Abstract No. 88-124623 of USSR 1339235 (Sep. 1987).
Chemical Abstracts, vol. 80, No. 98122, 1974.
Kohl, Arthur L. *Gas Purification*. Houston, Gulf Publishing Co. 1985. pp. 582–591 TP754 K6.
Hougen, Olaf A. *The Drying of Gases*. J. W. Edwards, Ann Arbor Mich. 1947 pp. 70–79.
Hammerschmidt, E. G. "Gas Hydrates and Gas Dehydration", in *Gas Engineers Handbook*, The Industrial Press, New York, 1965. pp. 4/72–4/80.
Hammerschmidt, E. G. "Formation of Gas Hydrates in Natural Gas Transmission Lines", in *Industrial and Engineering Chemistry* vol. 26, Aug., 1934. in Examiner's search room 55/29.

*Primary Examiner*—Gary Geist
*Attorney, Agent, or Firm*—Antonelli, Terry, Stout & Kraus

[57] ABSTRACT

A process for delaying the formation and/or reducing the agglomeration tendency of hydrates in conditions under which a hydrate may be formed, these hydrates being formed from water and gas.

The process according to the invention wherein, in particular, an additive comprising at least one amphiphilic compound chosen from the group of esters of polyols and substituted or unsubstituted carboxylic acids is used.

Application of the process according to the invention to processes using gases and water, which form hydrates between them, in particular in the petroleum or gas industry.

19 Claims, 1 Drawing Sheet

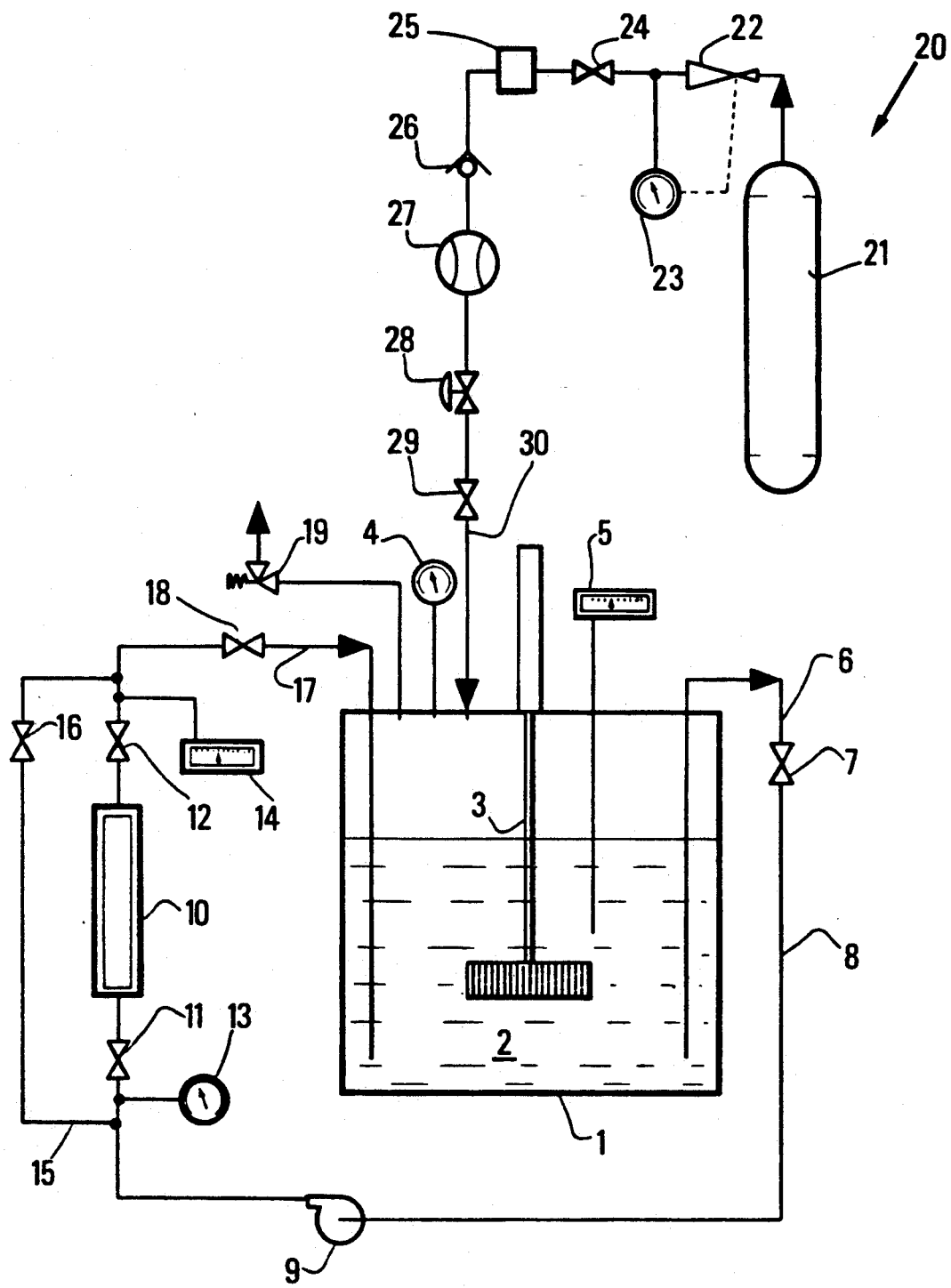

PROCESS FOR DELAYING THE FORMATION AND/OR REDUCING THE AGGLOMERATION TENDENCY OF HYDRATES

This application is a continuation of application Ser. No. 288,986, filed Dec. 23, 1988, now abandoned.

The invention relates to a process for delaying the formation and/or reducing the agglomeration tendency of hydrates of natural gas, petroleum gas or other gases by use of at least one additive. The gases which form hydrates can, in particular, comprise for example, methane, ethane, ethylene, propane, propene, n-butane, i-butane, $H_2S$ and/or $CO_2$.

These hydrates are formed when water is found in the presence of gas, either in the free state or dissolved in a liquid phase, such as a liquid hydrocarbon, and when the temperature reached by a mixture of, in particular, water, gas and possibly liquid hydrocarbons such as an oil, is below the thermodynamic formation temperature of hydrates, this temperature corresponding to a known composition of gases whose pressure is fixed.

The formation of hydrates is extremely troublesome, particularly in the petroleum and gas industry where the conditions for formation of hydrates may be combined. In fact, in order to reduce the cost of producing crude oil and gas, in terms of investments and operating costs, one solution envisaged, in the case of offshore production in particular, is to reduce, or even to suppress, the processes applied to the crude or to the gas to be transported from the field to the coast and, in particular, to leave some or all of the water in the fluid transported. These offshore processes are generally effected on a platform situated on the surface near a field, in a way such that the initially hot effluent can be treated before thermodynamic conditions favorable to formation of hydrates are reached due to cooling of the effluent by seawater.

However, in practice, when the thermodynamic conditions required for formation of hydrates are combined, agglomeration of the hydrates leads to filling and blocking of feeders by creating blockages which prevent all passage of crude petroleum or gas.

The formation of hydrate blockages may lead to a standstill in offshore production and thus incur major financial losses. Furthermore, restarting of the installation, especially in the case of offshore production or transport, can be a lengthy process as decomposition of the hydrates formed is not easy to carry out. In fact, when the output of an underwater field of natural-gas or petroleum and gas containing water reaches the surface of the seabed and is then transported along the seabed, thermodynamic conditions are often combined for the formation of hydrates, due a decrease in the temperature of the effluent produced, which then agglomerate and block the transfer line. The temperature at the seabed can be, for example, 3° or 4° C.

Conditions favoring the formation of hydrates can be combined in the same way on land in lines that are not buried at all or are not sufficiently buried in the ground, when for example, the temperature of ambient air is cold.

To avoid these inconveniences it is proposed either to add inhibitors which reduce the thermodynamic formation temperature of hydrates or to insulate feeders in such a way as to avoid allowing the temperature of the fluid transported to reach the temperature for formation of hydrates in the operating conditions in use.

These two solutions are very costly as, in the first case, the quantity of formation inhibitors added, the most currently used being methanol and ethylene glycol, can be up to 10 to 20% of content in water and these inhibitors are difficult to recover completely. As for the second solution, insulation of the line is also very costly.

It has been discovered that certain additives, which up to the present have not been used to this end, show great efficiency in reducing the formation temperature of hydrates and/or modifying the mechanism of formation of these hydrates because, instead of rapidly agglomerating to each other and forming solid blockages, the hydrates formed disperse in the fluid without agglomerating and obstructing the lines, as long as the temperature of the fluid transported is not too low.

Use of these additives is particularly advantageous from the economic point of view as the quantities used are very low (less than 0.5% in weight with respect to water) and the cost of the additives is moderate.

The additives used according to the invention, alone or in combination or possibly in the presence of other compounds (methanol, glycol, surfactant(s)), to delay the formation and/or reduce the agglomeration tendency of hydrates in conditions under which a hydrate may be formed, comprise amphiphilic compounds, notably non-ionic amphiphilic compounds or amphiphilic compounds including at least one imide group.

By amphiphilic compounds, we mean compounds comprising a hydrophilic or polar part and an oleophilic or lipophilic part.

Non-ionic amphiphilic compounds are characterized by comprising:

a hydrophilic part comprising alkylene oxide, hydroxyl or alkylene amine groups, an oleophilic part comprising a hydrocarbon chain derived from an alcohol, a fatty acid, alkylated derivative of phenol or an isobutene- or butene-based polyolefin, and a bond between the hydrophilic and oleophilic parts which can be, for example, an ether, ester or amide bridge. The bond can also be obtained from a nitrogen or sulfur atom.

Among the non-ionic amphiphilic compounds with an ether bridge, oxyethylated fatty alcohols, alkoxylated alkylphenols, oxyethylated and/or oxypropylated derivatives and ethers of sugars can be cited.

The non-ionic amphiphilic compounds with an ester bridge are obtained from condensation of ethylene oxide and a fatty acid, or from esters of carboxylic acids or mixtures of carboxylic acids or fatty acids on one hand, and alcohols on the other hand, or from carboxylic acid and alcohol chlorides, or from anhydrides and alcohols.

These carboxylic acids can be linear or nonlinear carboxylic acids (for example, branched), saturated or unsaturated corresponding, for example, to fatty acids contained in vegetable and animal fats. The carboxylic acids can be alkoxylated.

Among the linear saturated or unsaturated acids, the following acids can be cited: butyric (C4:0), caproic (C6:0), caprylic (C8:0), capric (C10:0), lauric (C12:0), myristic (C14:0), palmitic (C16:0), stearic (C18:0), arachidic (C20:0), behenic (C22:0), lignoceric (C24:0) corresponding to acids with an even number of carbon atoms (4 to 24); the unsaturated acids are: palmitoleic (C16:1), elaidic (C18:1t), oleic (C18:1c), linoleic (C18:2), linolenic (C18:3), gadoleic (C20:1), erucic (C22:1). The number of ethylenic unsaturations is indicated for each acid (0, 1, 2 or 3); C signifies CIS and t trans.

These saturated and unsaturated acids are generally present as such or in mixture in bonded form in oils, esters, in fatty acid mixtures.

The most commonly used oils are, for example, peanut, old and new rapeseed, coconut, cotton seed, wheatgerm, maize, olive, palm, palmnut, soybean, suet, lard, sunflower, butter, safflower, tall-oil (resinous extract), fish and karite.

Similarly, vegetable oils or animal fats provide mono or diglycerides which can confer beneficial emulsifying properties.

Acids with an odd number of carbon atoms can also be used.

The carboxylic acids may be diacids or triacids corresponding to dimers and trimers of fatty acids or to dicarboxylic acids such as dodecanedioic acid in which one of the acid groups may be free.

The carboxylic acids may be nonlinear acids such as abietic acid.

The carboxylic acid may be undecylenic acid.

The carboxylic acids may be hydroxycarboxylic acids, such as ricinoleic acid or hydroxystearic acids derived from castor oil hydrogenated castor oil.

The carboxylic acids can be epoxycarboxylic acids, such as epoxystearic acid or mixtures derived from epoxidated oils.

The carboxylic acids may be in the form of polymers such as estolized acids obtained, for example, from castor oil and for which the formula is:

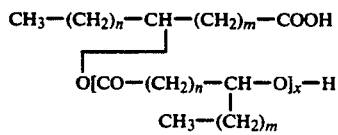

in which $1 \leq X \leq 20$ and $n+m=15$.

The carboxylic acid may be an alkenylsuccinic acid and the anhydride may be an alkenylsuccinic anhydride. The alkenyl group of the acid or anhydride may be derived from a polymer of a monoolefin containing 2 to 5 carbon atoms.

This polymer may be a polyisobutene in which the alkenyl group (for example polyisobutenyl) has an average molecular weight from 300 to 5000.

The alcohols used can be:

monoalcohols such as lauric alcohol, diols such as ethyleneglycol, polyalkyleneglycols (such as polyethyleneglycol or polyproyleneglycol) or neopentylglycol (NPG), triols such as glycerol or trimethylolpropane (TMP), tetrols such as pentaerythritol, erythritol (mono, di or trisubstituted), sorbitol, polyols such as sorbitol, mannitol, polyglycerols, dipentaerythritol, or sugars such as saccharose, glucose, fructose, or derivatives of these various products such as starch.

Polyol esters possessing free hydroxyl groups which can possibly be ethoxylated.

The polyglycerols used can be substituted alkoxylated polyglycerols such as mono or disubstituted polyglycerols.

The additive may comprise elements from the following polyglycerol ester group: triglycerol mono-oleate, hexaglycerol mono-oleate, hexaglycerol trioleate, decaglycerol mono-oleate, decaglycerol monostearate, decaglycerol monolaurate.

In addition to the advantageous results polyglycerols confer against the formation of hydrates and the blockages they produce, polyglycerols can have very varied HLB (Hydrophilic-Lipophilic-Balance), depending on their degree of polymerization, and can thus adapt optimally to the different properties of fluid containing water, gas and, possibly, an oil such as a condensate.

The additives with amide bonds used in the invention result from the reaction between a carboxylic acid or a methyl ester of a carboxylic acid and hydroxycarbylamines, such as diethanolamine or monoethanolamine.

The bond between the hydrophilic and lipophilic parts of the additive used according to the invention may also be obtained from a nitrogen atom, for example by condensation of a fatty amine with ethylene oxide, or from a sulfur atom, for example by condensation of ethylene oxide with mercaptans.

The additives used according to the invention, comprising at least one imide group, can be prepared by reaction of an alkenylsuccinic anhydride with one or more polyethylenepolyamines in such a way as to obtain alkenylsuccinimides.

The polyamines appropriate for the preparation of such alkenylsuccinimides comply, more particularly, with the general formula:

in which m is a whole number from 0 to 10. These biprimary polyamines can be, for example, ethylenediamine or polyethylenepolyamines such as diethylenetriamine, triethylenetetramine, tetraethylenepentamine, pentaethylenehexamine or commercially available mixtures of these polyamines.

The additive may be in a proportion between 10 and 50,000 ppm in weight with respect to water, and preferably between 100 and 5,000 ppm.

Moreover, the additive may be coupled with one or more surfactant compounds, preferably anionic surfactants, or it may consist of a mixture of additives.

The compounds in the mixture may have the same carboxylic acid and/or polyol in common.

Moreover, the additive may comprise an alcohol such as methanol, or a polyalkoxyglycol.

Said additive can be used to form hydrates in a dispersed state and/or to transport petroleum effluents containing water and forming hydrates with it.

When said additive is used to transport petroleum effluents, the compound may be added to the water and/or to the petroleum effluent in a proportion between 50 and 50,000 ppm in weight with respect to water and, preferably, in a proportion between 100 and 5,000 ppm.

The following examples illustrate the invention without in any way limiting it. Examples 1 and 2 are given as comparisons.

BRIEF DESCRIPTION OF DRAWINGS

In these examples, tests on the formation of hydrates from gas, condensate and water were carried out in order to estimate the efficiency of the additives, using the apparatus represented in the attached diagram.

The apparatus consists of a thermoregulated reactor 1 with a volume of 2 liters in which a liquid 2, such as a mixture of condensate and water, is placed and which is continuously stirred with a stirrer 3 attached to one end of a turbine. Supply of gas to reactor 1 is regulated with a pressure gage 4, the temperature of the reactor and the circulation loop is controlled with constant-temperature water baths whose temperature is regulated with a temperature probe 5. A pipe 6 with one end immersed in the liquid 1 supplies, with its other end, a circulation loop 8 which can be shut off with a valve 7.

A pump 9 ensuring circulation of the fluid and gas is attached to the circulation loop 8. The loop 8 also includes an observation chamber 10, isolatable by two valves 11 and 12, in which formation of hydrates can be observed.

Above and below this chamber, a pressure indicator 13 and a temperature indicator 14 are found. The apparatus includes a junction 15 from the observation chamber, this junction being equipped with a guard valve 16.

The fluid and gas, having gone through the observation chamber 10 or the junction 15, return to the reactor via a runback loop 17. A valve 18 allows the runback circuit to be isolated. The reactor 1 also includes a safety valve 19.

Supply of gas to the reactor 1 is carried out with a circuit, designated 20 as a whole and which includes the following elements, assembled one after the other: a gas reservoir 21, a pressure reducer 22, a fixed pressure gauge 23 controlling the pressure reducer 22, a shutoff valve 24, a filter 25, a check valve 26, a flowmeter 27, an electronic valve 28, controlled by the pressure gage 4 and ensuring fixed pressure within the reactor by modification of gas flow, a guard valve 29 and a supply loop 30 penetrating into the reactor.

In a practical example, the circulation loop 8 is 10 meters long and is in the form of a tube with an internal diameter of about 19 mm ($\frac{3}{4}$"). The circulation pump 9 allows flow-rates up to 1 m/s.

The formation of hydrates by reaction of gas with water can be seen from the consumption of gas which is determined by the flowmeter 27 and which is controlled by the electronic valve 28 and the differential pressure gage 23, in a way such that the pressure is kept constant in the circuit to plus or minus 1/50th of a bar.

In order to determine the temperature at which hydrates are formed, a rapid decrease in temperature of 3° C. per hour is effected from ambient temperature to 1° C.

Having noted the temperature at which hydrates are formed, seen by a consumption of gases, the temperature of the reactor and circulation loop is increased to 5° C. above this formation temperature until decomposition of hydrates is complete. This decomposition is revealed by an increase in pressure in the reactor 1 and by the visual disappearance of the opacity of the fluid, produced by the presence of hydrates.

Finally, a slow decrease in temperature, in the order of 1° C./hour, is effected and the temperature at which hydrates begin to form is determined, then the temperature at which the circuit is completely blocked and no circulation of the fluid is possible is determined.

EXAMPLE NO. 1

In this example, a fluid consisting of 20% in volume of water and 80% in volume of condensate is used. The condensate weight composition is: for molecules having less than 11 carbon atoms: 20% of paraffins and isoparaffins, 48% of naphthenes, 10% of aromatics; and for molecules having at least 11 carbon atoms: 22% of a mixture of paraffins, isoparaffins, naphthenes and aromatics. The gas used comprises 98% in volume of methane and 2% in volume of ethane. Experimentation is carried out under a pressure of 7 MPa, kept constant by supplying gas.

Under these conditions, the temperature at which hydrates start to form, during the second decrease in temperature, is 11.4° C. and blockage of circulation by increase and coalescence of hydrates occurs when the temperature reaches +11° C. (284 K), that is, 24 minutes after the hydrates start to form.

EXAMPLE NO. 2

In this example, the procedure of example n° 1 is followed with the same fluid, gas and pressure but 5% in weight of methanol with respect to the water in the mixture is added to the circulating fluid. Under these conditions, it is observed that the temperature at which hydrates start to form is 9.4° C. and that the temperature at which no circulation of fluid is possible is 9° C.

EXAMPLE NO. 3

The procedure in example no. 1 is followd but 0.2% in weight of sorbitan monolaurate with respect to water is added to the circulating fluid.

Under these conditions, it is observed that the temperature at which hydrates start to form is 9.7° C. and that blocking of fluid circulation occurs at +5° C.

EXAMPLE NO. 4

In this example, the same procedure as in example no. 1 is used but 0.2% in weight with respect to water of a mixture of 80% in weight of sorbitan monolaurate and 20% in weight of sodium dioctylsulfosuccinate (at a concentration of 65% in weight) is added to the circulating fluid.

Under these conditions, it is observed that the temperature at which hydrates start to form is 9.3° C. and that blocking of fluid circulation occurs at +4.5° C.

EXAMPLE NO. 5

The procedure in this example is the same as in example no. 1, but 0.2% in weight with respect to water of a mixture consisting of 50% in weight of sorbitan monolaurate and 50% in weight of sorbitan trioleate is added to the circulating fluid.

Under these conditions, it is observed that the temperature at which hydrates start to form is 9.2° C. and that blocking of fluid circulation occurs at +2° C.

EXAMPLE NO. 6

The procedure in this example is the same as in example no. 1, 0.2% in weight, with respect to water, of ethoxylated sorbitan monolaurate, having an ethoxylation ratio of 20 is added to the circulating fluid.

Under these conditions, it is observed that the temperature at which hydrates start to form is 9.3° C. and that blocking of fluid circulation occurs +3° C.

EXAMPLE NO. 7

Again the procedure in example no. 1 but is followed 0.2% in weight, with respect to water, of a mixture of 50% in weight of ethoxylated sorbitan monolaurate, having an ethoxylation ratio of 20, and 50% in weight of sorbitan sesqui-oleate is added to the circulating fluid.

Under these conditions, it is observed that the temperature at which hydrates start to form is 8.8° C. and that blocking of fluid circulation occurs at −3° C.

EXAMPLE NO. 8

The procedure in this example is the same as in example no. 1, but there is added to the circulating fluid 0.5% in weight with respect to water of a solution containing 70% in weight of polyisobutenylsuccinimide in an aromatic cut. The polyisobutenyl-succinimide is obtained by reaction of polyisobutenylsuccinic anhydride (whose polyisobutenyl group has an average molecular weight of about 3000) and a commercial mixture of tetraethylene pentamine (TEPA), in an anhydride/TEPA molar ratio of 1.5.

Under these conditions, it is observed that the temperature at which hydrates start to form is 7.4° C. and that blocking of fluid circulation occurs at +2° C.

EXAMPLE NO. 9

The procedure in this example is the same as in example no. 1, but to the circulating fluid 0.2% in weight with respect to water of a mixture of 50% in weight of ethoxylated nonylphenol of density equal to 1.12 and 50% in weight of octylphenol of density equal to 1.075.

Under these conditions, it is observed that the temperature at which hydrates start to form is 10.2° C. and that blocking of fluid circulation occurs at +7.2° C.

EXAMPLE NO. 10

The procedure in this example is the same as in example no. 1, but there is added to the circulating fluid 0.5% in weight with respect to water of palmitic acid monoglyceride.

Under these conditions, it is observed that the temperature at which hydrates start to form is 7.9° C. and that blocking of fluid circulation occurs at +5.6° C.

EXAMPLE NO. 11

In this example the procedure of example no. 1 was again followed to the circulating fluid 0.5% in weight with respect to water of a mixture of 85% in weight of palmitic acid monoglyceride and 15% in weight of sodium dioctylsulfosuccinate (at a concentration of 65% in weight).

Under these conditions, it is observed that the temperature at which hydrates start to form is 7.8° C. and that blocking of fluid circulation occurs at +5.1° C.

In examples 1 and 2, in the presence of methanol only or with the fluid to be tested only, it is observed that blocking of the loop occurs very soon after the formation of hydrates starts, that is, 0.4° C. below the temperature at which formation of hydrates starts, that is, 24 minutes after having reached this temperature, the time necessary for coalescence and growth of hydrates.

On the other hand, when polyol esters, such as sorbitan esters, are used, it is observed that the temperature at which blocking of fluid circulation occurs is very much lower than the temperature at which formation of hydrates starts.

It is also noted that, concerning the composition of the fluid used, ethoxylation of sorbitan monolaurate (examples 3 and 6) has a beneficial effect on reducing in temperature at which formation of hydrates starts and blockage of circulation occurs and that, while keeping the same additive concentration, association with a sorbitan polyoleate is also favorable. Moreover, sesquioleate has a greater effect than trioleate.

The beneficial effect of the addition of sodium dioctylsulfosuccinate, which is an anionic amphiphilic compound, to a non-ionic amphiphilic compound essentially consists of substantially reducing the temperature at which formation of hydrates starts and, in particular, the temperature at which blocking of the circulating fluid occurs.

Examples 3 and 4 show a gain of −0.4° C. and −0.5° C. respectively on the temperatures at which formation of hydrates starts and blocking of the circulation of a fluid comprising 0.2% sorbitan monolaurate occurs.

Examples 10 and 11 show a gain of −0.1° C. and −0.5° C. respectively on the temperatures at which formation of hydrates starts and blocking of the circulation of a fluid comprising 0.5% palmitic acid monoglyceride occurs.

What is claimed is:

1. A process for reducing the agglomeration tendency of hydrates within a fluid comprising water and a gas in conditions under which hydrates can be formed, the hydrates being formed from water and gas, wherein an additive comprising at least one non-ionic amphiphilic compound selected from the group consisting of esters of polyols and substituted or unsubstituted carboxylic acids is incorporated into the fluid and at least one hydrate is obtained in a dispersed form in said fluid said additive further comprising an amphiphilic anionic compound.

2. A process for reducing the agglomeration tendency of hydrates within a fluid comprising water and a gas in conditions under which hydrates can be formed, the hydrates being formed from water and gas, wherein an additive comprising at least one non-ionic amphiphilic compound that is an ester of a polyalkyleneglycol and an alkenylsuccinic anhydride is incorporated into the fluid and at least one hydrate is obtained in a dispersed form in said fluid.

3. A process for reducing the agglomeration tendency of hydrates within a fluid comprising water and a gas in conditions under which hydrates can be formed, the hydrates being formed from water and gas, wherein an additive comprising at least one non-ionic amphiphilic compound that is an ester of a polyethylene glycol and polyisobutenylsuccinic anhydride is incorporated into the fluid and at least one hydrate is obtained in a dispersed form in said fluid.

4. A process according to claim 3, wherein said fluid comprises liquid hydrocarbons.

5. A process for reducing the agglomeration tendency of hydrates within a fluid comprising water and a gas in conditions under which hydrates can be formed, the hydrates being formed from water and gas, wherein an additive comprising at least one non-ionic amphiphilic compound selected from the group consisting of esters of polyols and substituted or unsubstituted carboxylic acids is incorporated into the fluid; said polyols being chosen from the group consisting of polyalkoxyglycols, neopentylglycol, glycerol, polyglycerol, trimethylolpropane, pentaerythritol, dipentaerythritol, sorbitol, sorbitan, mannitol, manitan, glucose, saccharose, and fructose, and said carboxylic acids of said esters are linear and either saturated or unsaturated carboxylic acids.

6. A process according to claim 5, wherein said at least one non-ionic amphiphilic compound is sorbitan monolaurate.

7. A process according to claim 5, wherein said at least one non-ionic amphiphilic compound is sorbitan monolaurate in admixture with sodium dioctylsulfosuccinate.

8. A process according to claim 5, wherein said at least one non-ionic amphiphilic compound is sorbitan monolaurate in admixture with sorbitan trioleate.

9. A process according to claim 5, wherein said at least one non-ionic amphiphilic compound is ethoxylated sorbitan monolaurate having an ethoxylation ration of 20.

10. A process according to claim 5, wherein said at least one non-ionic amphiphilic compound is ethoxylated sorbitan monolaurate having an ethoxylation ration of 20 in admixture with sorbitan sesqui-oleate.

11. A process according to claim 5, wherein said at least one non-ionic amphiphilic compound is palmitic acid monoglyceride.

12. A process according to claim 5, wherein said at least one non-ionic amphiphilic compound is palmitic acid monoglyceride in admixture with sodium dioctylsulfosuccinate.

13. A process according to claim 5, wherein said fluid comprises liquid hydrocarbons.

14. A process according to claim 5, wherein said additive is in a proportion between 10 and 50,000 ppm by weight with respect to the water.

15. A process according to claim 5, wherein said additive is in a proportion between and 100 and 5,000 ppm by weight with respect to said water.

16. A process according to claim 5, wherein the temperature at which agglomeration of the formed hydrates occurs is reduced by the addition of said additive.

17. A process according to claim 5 wherein said amphiphilic compound is a mono or polyoxyalkylated compound.

18. A process according to claim 5, wherein said carboxylic acids are linear fatty acids derived from vegetable or animal oils and fats.

19. Process according to claim 5 wherein said additive further comprises an amphiphilic anionic compound.

* * * * *